July 10, 1934.  C. A. SPOTZ  1,966,145
TOY VEHICLE
Filed Oct. 5, 1932  6 Sheets-Sheet 1

KEY
Li. = LIGHTS
Str = STEERING
B.C. = BODY CONTROL
D.Cl. = POWER CLUTCH and BRAKE
M.C. = MOTOR CONTROL
H. = HORN Inventor:
Chester A. Spotz,
By Spear, Donaldson + Hall
Attorneys.

July 10, 1934.  C. A. SPOTZ  1,966,145

TOY VEHICLE

Filed Oct. 5, 1932  6 Sheets-Sheet 2

Inventor:
Chester A. Spotz,
By Spear, Donaldson & Hall
Attorneys

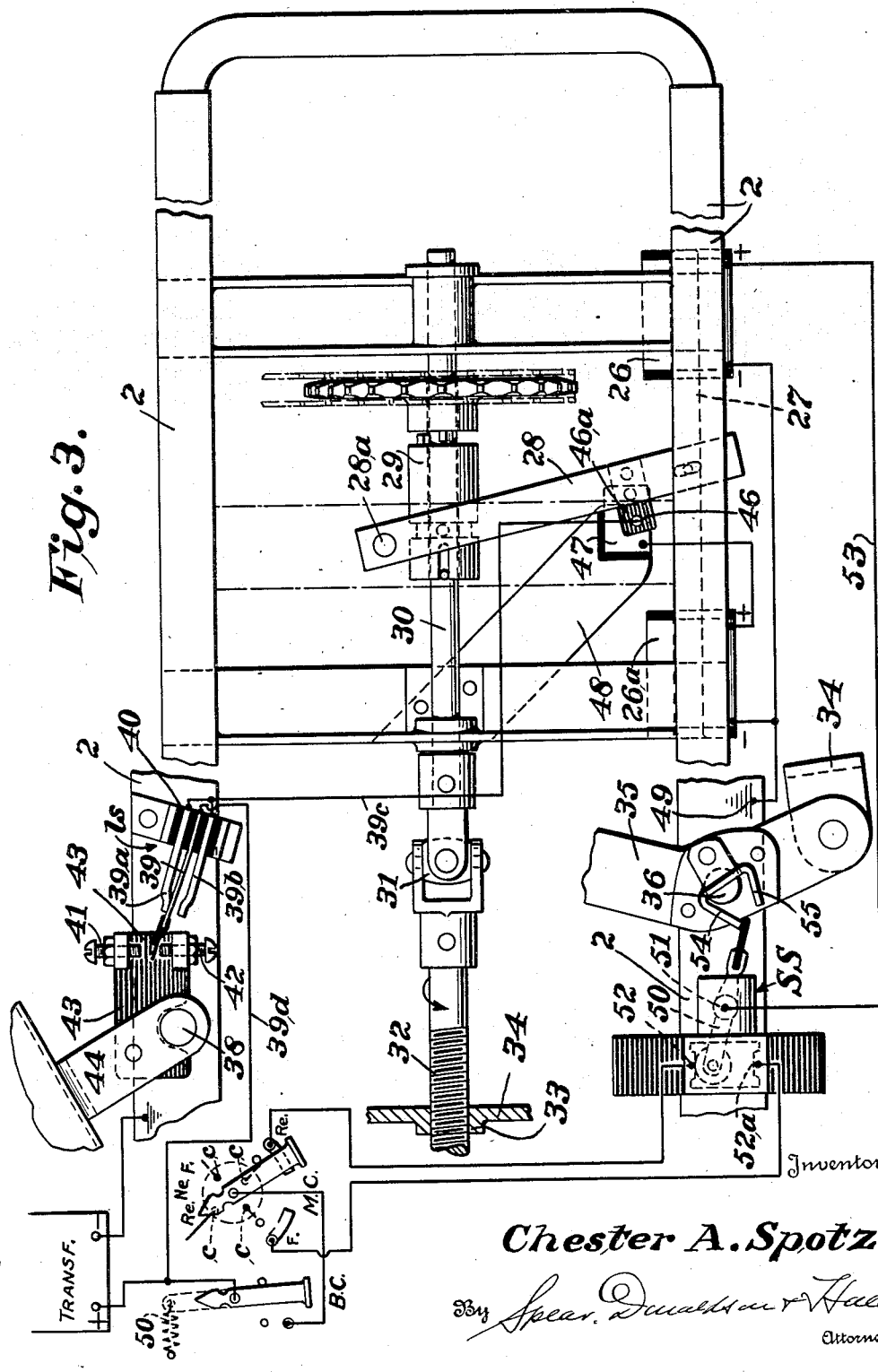

July 10, 1934.　　　　C. A. SPOTZ　　　　1,966,145
TOY VEHICLE
Filed Oct. 5, 1932　　　6 Sheets-Sheet 4

Inventor:

Chester A. Spotz,

By Spear Donaldson + Hall
　　　　Attorneys.

July 10, 1934.     C. A. SPOTZ     1,966,145
TOY VEHICLE
Filed Oct. 5, 1932     6 Sheets-Sheet 5
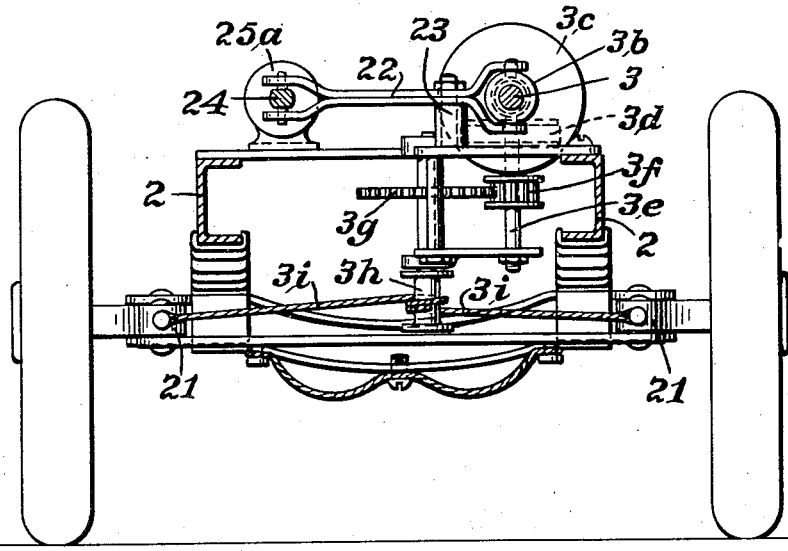
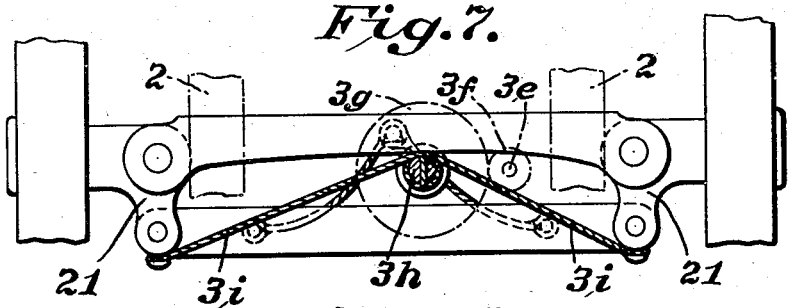
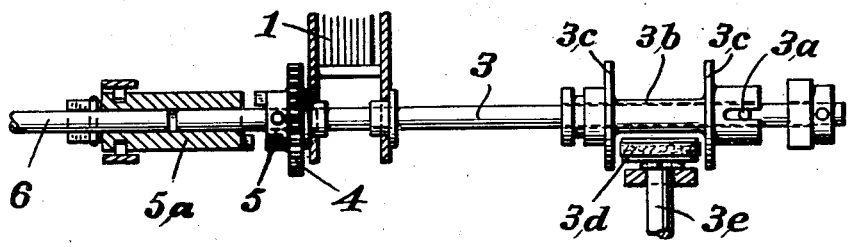
Inventor:
Chester A. Spotz,
By Spear Donaldson & Hall
Attorneys.

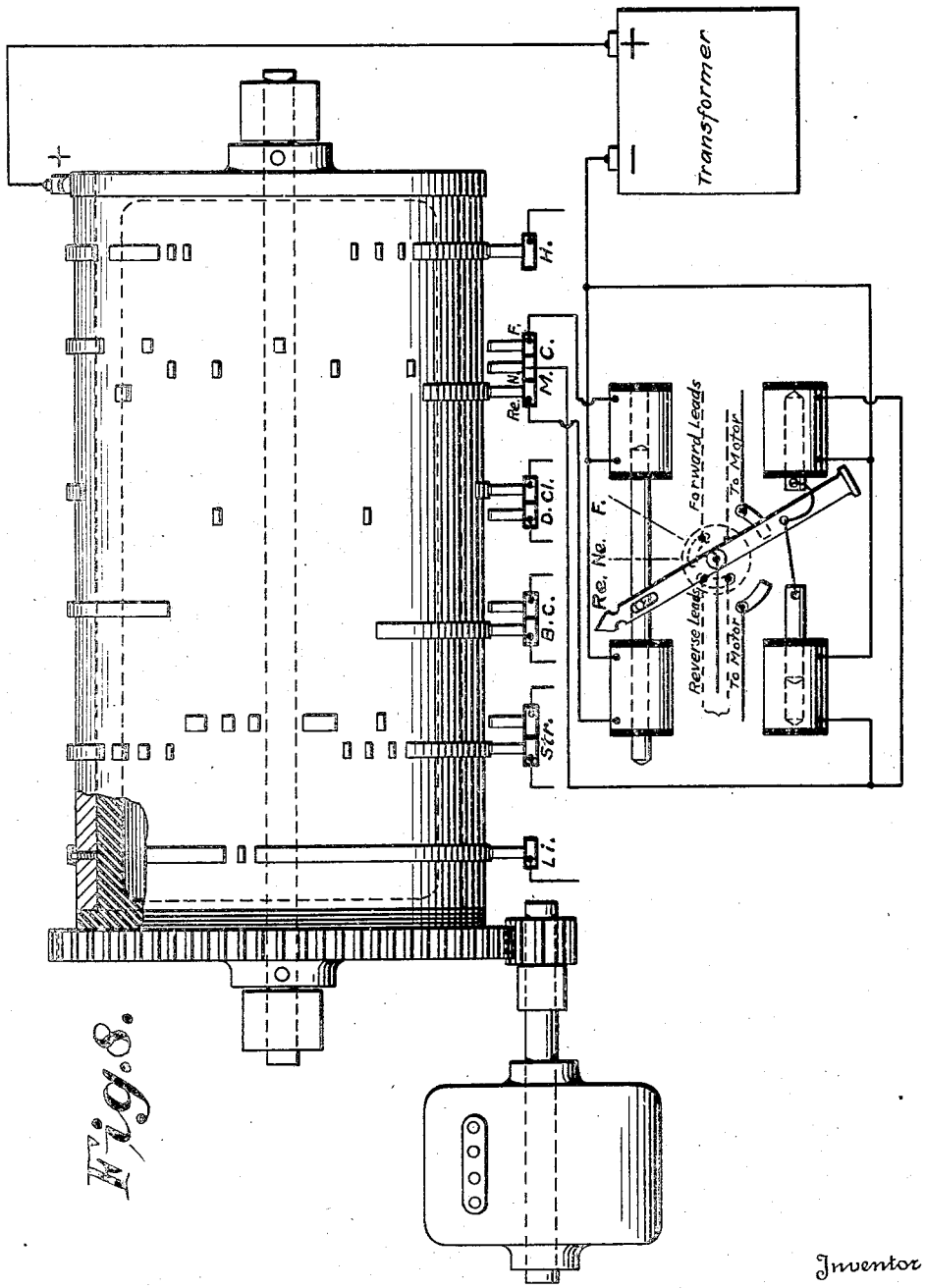

Patented July 10, 1934

1,966,145

UNITED STATES PATENT OFFICE 1,966,145

TOY VEHICLE

Chester A. Spotz, Greenwich, Conn.

Application October 5, 1932, Serial No. 636,419

21 Claims. (Cl. 46—49)

The invention concerns a toy vehicle such for instance as a dump wagon with means whereby under remote control exerted through certain control levers or contacts on a control panel or box the vehicle can be driven forward or backward from an electric motor mounted thereon, can be steered, its body can be raised or lowered, its horn can be sounded and its lights controlled.

While I have chosen a dump wagon as one form of the invention for the purpose of setting forth the novel features, I do not limit myself in this respect and, therefore, said dump wagon is to be regarded as representative of any form of vehicle or motor propelled body and the dumping body as representative of any service member which is movably mounted on the body or vehicle and which like the propelled body is subject to remote control in its operation.

The invention has the capacity of executing simultaneously a plurality of performances, for instance, the steering can be accomplished during either the forward or backward movement of the vehicle, the body or like movable member may be operated while the vehicle is at rest or while it is being moved either forward or backward or while it is being steered and the lights can be put on or off or the horn sounded during the travelling movement of the vehicle forward or backward.

Clutch means are employed to deliver or not deliver power from the motor to the driving mechanism and to the means for raising or lowering the body of the wagon and a brake is employed to check the movement of the vehicle when the power for driving it is put out of service.

The toy may assume various forms, but I have shown it for convenience in connection with a dumping wagon. The throwing out of the clutch to stop driving the vehicle will apply the brake.

The power for driving or operating the mechanism is derived from an electric motor mounted on the chassis frame to which motor current is delivered from the house circuit through plugging into a floor or wall socket.

The steering of the vehicle can be accomplished either by one continuous action or by step by step actions and when the control lever which supplies current for effecting the steering movement is released it automatically returns to neutral position leaving, however, the steering mechanism in the position in which it was previously set so that another action of the control lever, either to right or left as the case may be, must be performed in order to change the position of the steering wheels back to normal straight ahead position or to a position for changing the steering action to a different degree or to reverse the direction of steering to right or left as desired.

The invention also embodies safety appliances whereby jamming of the mechanism is prevented. In the present embodiment of the invention which is chosen to illustrate the principles involved in the invention the safety appliances we employed to control the operation of a dumping body or what may be termed the service member so that when the limit of movement of the body is reached the safety appliance will operate to throw out the power to the body and to set certain connections ready to function when the reverse movement of the body is to take place.

The invention consists in the features and combination and arrangement of parts hereinafter described and particularly pointed out in the claims.

In the accompanying drawings

Fig. 3 is a plan view of a diagrammatic nature of the body control mechanism.

Fig. 6 is a cross-sectional view of the chassis showing steering mechanism.

Fig. 7 is a plan view of parts of Fig. 6.

Fig. 7a is a detail relating to the steering mechanism.

Fig. 8 is a diagram of a remote control involving a drum having contact points for closing the circuits in a prescribed order automatically so that the toy may be made to perform its various operations without requiring the attention of an operator.

Figure 1:
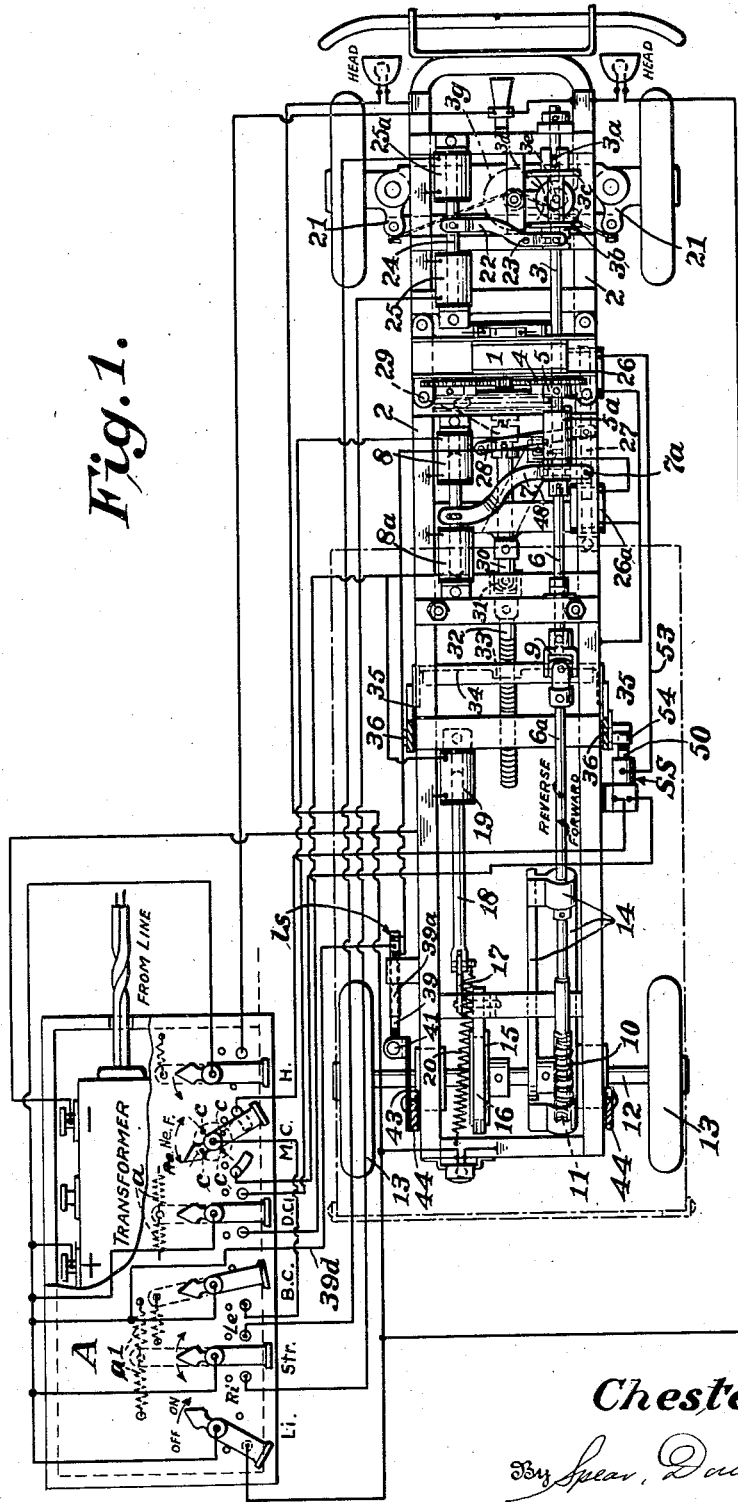
Fig. 1 is a plan view in the nature of a diagram of the invention and its circuits.
Figure 2:
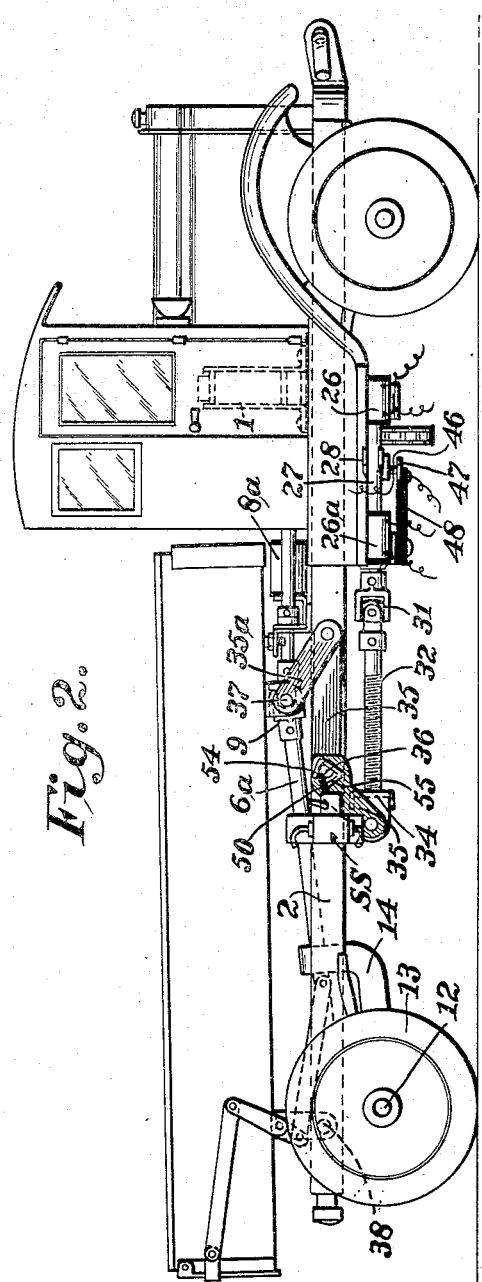
Fig. 2 is a side view of the toy vehicle.

In these drawings the electric motor 1 is mounted on the chassis frame composed of side bars 2, and drives the shaft 3 through any suitable gearing indicated generally at 4. This driver shaft has fixed thereon one member 5 of the main driving clutch. The other member of this clutch is splined to a transmission shaft 6, and is operated to engage or disengage the main clutch member by a lever 7 pivoted at 7a to the frame and operable by the cores of solenoid coils 8 and 8a. The transmission shaft has a universal joint at 9 between its front horizontal section and its rear downwardly inclined section 6a and at its rear end the inclined shaft section has a worm 10 engaging a worm wheel 11 on the rear axle 12 of the chassis upon which the rear traction elements 13 are mounted which in the illustrated form of the invention may be wheels though the invention is not limited in this respect. A suitable supplemental frame member 14 may be mounted on the rear axle to support the rear end portion of the inclined transmission shaft. On this rear axle also a brake disc 15 is fixed. This is engaged by a brake band 16, controlled by a lever 17 and rod 18 which at its front end forms the core of a solenoid 19. This solenoid is in circuit with the clutch release solenoid 8a so that when the main driving clutch 5, 5a is thrown out of service by energizing the solenoid 8a the solenoid 19 also will be energized to draw upon brake rod 18 and apply the brakes.

The control lever for performing this operation is shown at DCL on the remote control panel A. This lever is returned to neutral by spring a.

When this lever is on the left hand contact Fig. 1, the solenoid 8a is energized and the main clutch 5, 5a is disconnected and the brake is set, and when said lever DCL is on the right hand contact the circuit is broken to the coils 8a and 19 but closed to the solenoid coil 8 and then the brake is released and the clutch 5, 5a is set for driving the transmission shaft in either one direction or the other according as the electric motor is driving forward or reverse.

The release of the brake, when solenoid coil 19 is de-energized takes place by means of spring 20 connected to the brake lever 17 at one end and the frame at the other end. For steering the main drive shaft 3 Figs. 1, 6, 7 and 7a at its front end has splined thereto at 3a a sleeve 3b carrying discs 3c, adapted to severally engage a disc 3d on a vertical shaft 3e having a pinion 3f meshing with a gear 3g on a vertical shaft on which is mounted a drum 3h. A cable 3i extending from this drum to the steering knuckles 21 will adjust the forward steering wheels to determine the direction of movement of the toy vehicle either forwardly or backwardly. The steering sleeve 3b is operated by a lever 22 pivotally mounted at 23 and connected to the core rod 24 of a pair of solenoid coils 25, 25a one being for steering to the right and the other for steering to the left. These coils are controlled from a control lever Str on the control panel. This lever is returned to neutral from either direction by spring a1. When this lever is held on the contact Ri, Fig. 1, the coil 25 will be energized for steering rightward and when the control lever Str is held on the contact Le the steering of the vehicle will be towards the left because then the coil 25 will be de-energized and the coil 25a will be energized to steer to the left.

When the steering lever Str is in neutral position to which it is returned, when released, by spring shown in Fig. 1, the front steering wheels will remain in the position to which they have been set during the last steering operation and it requires, in order to alter the direction of steering, that a new adjustment of the steering must be effected and this may be done by operating the lever Str either leftward or rightward as may be desired. It will be noticed that by moving the control lever Str back and forth between neutral position and either one of the contacts Ri or Le the steering of the vehicle can go on progressively or step by step because the steering wheels instead of swinging laterally by one movement to their final position for steering can be moved to said position by a series of step by step actions. Other forms of steering mechanism may be employed besides the friction disc drive above described such as by bevel gearing or by solenoids in more direct association with the steering mechanism than described above.

The transmission shaft 6 is axially in the same vertical plane with the axis of the main driving shaft 3. Said drive shaft 3 extends to the front of the chassis from the motor while the shaft 6 extends rearwardly from the motor.

Figure 4:
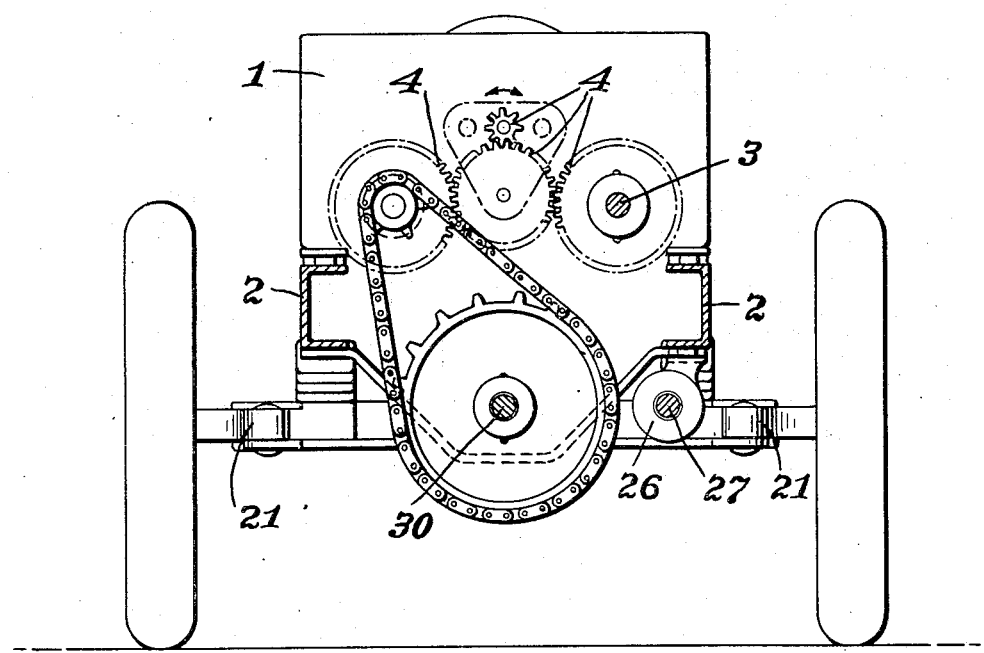
Fig. 4 is a cross-sectional view showing the electric motor and driving connections.
Figure 5:
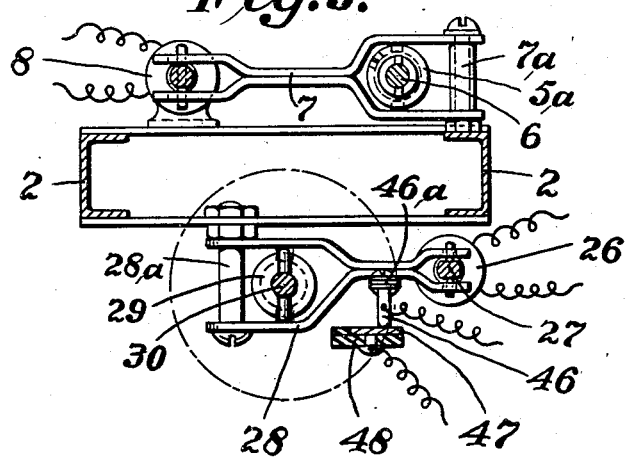
Fig. 5 is a cross-sectional view showing the main drive clutch for propelling the vehicle and the clutch controlling the operation of the body.

For raising and lowering the body of the vehicle for purposes of dumping the material and restoring the body to normal position, a pair of solenoid coils 26, 26a Fig. 3 are employed in the chassis the cores of which are connected by a rod 27 to which is pivotally connected a lever 28 pivoted at 28a which controls a clutch 29 by which power from the motor 1 is delivered, or not delivered, to a shaft 30, through a universal joint 31 to a screw shaft 32 which passes through a nut 33 of a cross bar 34 which has upwardly extending arms 35 pivoted at 36 to the chassis frame and at their upper ends pivoted to links 35a which are pivoted to the body of the vehicle at 37. By this mechanism the body can be raised about their rear pivots 38 to inclined position for dumping or can be lowered to normal horizontal position. The drive connection from the motor to the shaft 30 can be of any suitable form as gearing, or a sprocket chain and wheels, Fig. 4.

The forward or backward movement of the mechanism may be derived through a motor capable of either forward or reverse movement under the control of a suitable switch on controlling suitable circuits, though I do not limit myself in this respect. Such a switch arm is shown in Fig. 1 at MC cooperating with contacts when in the positions F for forward driving, Re for the reverse drive and Ne for the neutral position.

The circuit wires to the motor connect with the contacts c and reversing is done by shifting the lever from one pair of contacts to the other.

Means are provided for automatically stopping the movement of the body upwardly for dumping and for automatically cutting off the power when the body is lowered to prescribed normal position. For this purpose a limit switch 1s, Fig. 3, is associated with the body said switch comprising a contact blade 39 fixed at one end to an insulating block 40 fixed to the chassis frame, and having its free end extending between upper and lower screws 41, 42 carried by an arm 43 fixed to the hanger 44 of the body which is pivotally mounted on the chassis frame at 38. This flexible contact blade has an insulated end with which the screws contact to press it either up or down. The contact blade 39 when raised closes a circuit through contact blade 39a and when depressed it closes a circuit through contact blade 39b. In the position of the parts shown in Fig. 3 the body is raised for dumping and the circuit is closed through contact 39, 39a, lead wire 39c, contact 46, brass plate 47 to solenoid coil 26a. The contact 46 is mounted on an insulating block 46a carried by the lever 28 which controls the body operating clutch 29 controlling the motor drive. The brass plate 47 is mounted on an insulated arm 48 forming a part of the frame work. The closing of the circuit from transformer through lead 39d and through contacts 39, 39a and solenoid 26a moves the lever 28 leftward in Fig. 3 to disconnect the clutch 29 for arresting the upward movement of the body and the continued movement of the lever 28 causes the circuit just mentioned to be opened by reason of the contact 46 on the clutch lever passing off from the brass plate 47, thus de-energizing the solenoid coil 26a and thus preventing it from being burned out. The circuit just mentioned which includes the solenoid magnet 26a which throws out body controlling clutch 29 is grounded at 49, Fig. 3. Current is supplied to the contact blade 39 through lead wire 39d from the transformer connected in the house circuit.

To raise the body for dumping the motor is run in forward direction i. e. such as would propel the car forward if in gear at the main transmission clutch 5, 5a. This motion of the motor in its forward direction is transmitted to the screw 32 through the body moving clutch 29, it being understood that the solenoid 26 has been energized to close the said clutch 29.

In the final part of the raising movement of the body the contact 39 engages the contact 39a and closes the circuit to clutch release solenoid coil 26a through the contacts 46 and 47. This results in moving the lever 28 and releases the clutch 29 and stops the raising movement of the body. During this action the motor control switch MC is on the forward contact F. With the body up and the body controlling clutch 29 released the vehicle may be moved forward or backward as may be desired by operating the lever DCL for controlling the clutch 5, 5a and at the same time operating the motor control switch MC to deliver current for either forward or reverse driving.

Now to lower the body the motor control switch MC is placed on the reverse contact so as to reverse the motor through circuits not shown controlled by contacts c. Circuit is now closed to the solenoid 26 which being energized operates the lever 28 to throw in the clutch 29 which through the screw 32 now running in reverse direction owing to the reverse movement of the motor will lower the body until the upper screw 41, Fig. 3, on the body hanger moves the blade 39 of the limit switch 1s downwardly to engage the contact 39b whereupon the stopping circuit heretofore traced through contacts 46, 47 to the clutch releasing solenoid 26a will be established for releasing the clutch 29 thus stopping further lowering movement of the body.

In the position of the parts shown in Fig. 3 the dumping or service body is raised to its dumping position and contacts 39, 39a have just closed and clutch 29 is about to be released with the dump body remaining in up position.

At the end of each up or down movement of the dumping body current will be available at the limit switch 1s through blade 39 to supply the circuit closed by either 39, 39a or 39, 39b for energizing release solenoid 26a when the limit of movement of the dumping body either up or down is released.

A safety switch is provided at SS comprising a shifting contact 50 pivotally mounted at 51 on the frame, and having a roller contact member to close with either of the fixed contacts 52, 52a, suitably mounted on the chassis. Contact 52 is connected by line wire to the contact Re of the motor control switch MC, and contact 52a of the safety switch is connected with contact F of the motor control switch. The safety switch arm is connected by lead wire 53 extending from its axis to one end of solenoid coil 26, the other end of said coil being connected to ground. The safety switch lever 50 is operated mechanically at each end of the up and down movements of the dumping body by projections 54, 55, mounted on one of the arms of the lever mechanism which raises and lowers the dumping body, so that, for instance, when the body is raised, as in Fig. 3, the projection 54 will engage the switch lever 50, break engagement with contact 52a, and swing it up into engagement with contact 52. This action of breaking engagement with contact 52a will de-energize solenoid 26. The same upward movement of the dumping body will energize solenoid 26a through contact blades 39, 39a, and hence the operation of the screw 32 will cease and the dumping body will stop in its raising action.

These safety actions will take place even though the body control lever BC is held on its contact. Hence, on this upward movement of the body, three things happen, (it being understood that during this upward movement the motor control switch MC has been on its forward control F for forward running of the vehicle, provided the transmission clutch is thrown in). One of these things is breaking the circuit at 52a to the clutch setting solenoid 26, another is the closing of the circuit to the clutch release solenoid 26a, and the third thing is closing the contact at 52 preparatory to energizing the clutch solenoid 26 again when motor control switch MC is set on reverse contact and body control lever BC is swung clockwise to close its contact. When released, said body control lever will be returned to open position by its spring.

Now, in order to lower the body, the motor control switch is set with its lever on the reverse contact Re to reverse the motor, and the body control lever BC at the same time is set on its contact by swinging it to the right, or clockwise, in Fig. 3, against the tension of its spring, whereupon current will go to the axis of the lever MC, contact Re, contact 52, safety switch lever 50, and by lead wire to solenoid 26, which will be energized again, and as this solenoid is stronger than solenoid 26a, the lever 28 will be operated to set the body clutch 29 into connection with the motor train for reversing the action of the screw shaft 32 and consequently the body will begin to lower. The superior strength of the solenoid 26 in respect to that of solenoid 26a comes into play when the downward movement of the body is first initiated, because with the body all the way up, and the contact blades 39, 39a in contact, there would be a short period of time when both solenoid coils 26 and 26a would be energized, because as soon as contact 46 got on brass piece 47, owing to the energizing of coil 26, current would go to 26a until the body had moved down far enough to break contact between blades 39 and 39a. When this latter contact 39, 39a is broken, however, due to the body having been moved down a slight distance, then solenoid 26a will be de-energized, the other solenoid 26 maintaining clutch 29 in operative position.

Now, when the body has about reached its lower limit, the safety projection 55 will operate the safety switch lever, breaking the circuit of the solenoid 26 at 52, and setting the safety switch on contact 52a which is in a branch circuit open at the motor control switch MC set, as shown in Fig. 3, in reverse position. Coil 26 thus having been de-energized, the body operating clutch 29 will be thrown out of operation by contact blade 39 on the body engaging contact 39b, thus closing circuit to the solenoid coil 26a through contact 46 and brass plate 47, thus leaving the body in its lowered position and with contact made at 52a ready to deliver current to the solenoid coil 26 for engaging clutch 29 and raising the body again when the motor control switch MC is set on its forward contact F, and the body control lever BC is operated to close its circuit.

The automatic switch SS, cooperating with switch 39, safeguards the apparatus from being jammed, the former de-energizing coil 26 when the body reaches either its upper or lower limit, and the switch at 39 energizing the solenoid coil 26a to release clutch 29 and stop movement of the body, whether it be going up or down.

One function of the safety switch SS is to insure that the body operating clutch 29 be not set to operate by solenoid 26 until the motor control switch has been set so as to cause the movement of the motor drive in the right direction for moving the body from the position that it is in to the opposite limit. For instance, with the body up, as in Fig. 3, no current could be delivered to the coil 26 so long as the switch MC remained on forward drive contact F, because the circuit has been broken at 52a. By closing the contact at 52, preparation is made for completing the circuit as soon as motor switch MC is set on contact Re for reversing the motor and lowering the dumping body.

The invention is not limited to the use of a reversible motor for effecting forward and backward running of the vehicle, and up and down movement of the body, as a one direction motor can be employed with a clutch which will reverse the direction of transmission of the power. Hence, the circuits closed at the pairs of contacts $c$ of the motor control switch MC can be made to control a change in the direction of the drive by means of reversing gears or clutches instead of reversing the motor.

Nor do I limit myself to hand operated control levers or circuit contact members, as said members may be operated in any prescribed sequence by a pattern drum.

The invention is not limited to friction gears or other forms of gears in the steering mechanism, as the steering may be done by electro-magnets or solenoids.

The wheels can be set at desired angles for steering while the vehicle is at rest. The motor under this condition would be running, and the distant control steering lever would be operated to set the wheels in position. The main driving clutch 5, 5a would be out under a proper setting of the distant control lever DCh. What has just been said regarding the steering wheels is also true of the dumping body, it being possible to operate the body from the distant control lever BC and the motor control lever MC either up or down, while the vehicle is at rest, or with the vehicle moving.

As before stated, the dumping body is representative of any service element mounted upon the chassis and movable in relation thereto, controls from a distant control station, which needs to be moved to carry out the purposes of the particular form of toy in which the invention may be embodied.

A steam shovel would have characteristics generally similar to a dumping wagon in the sense that the shovel member would be mounted movably on the chassis and operated in relation thereto by a control lever at the remote control station.

Figure 9:
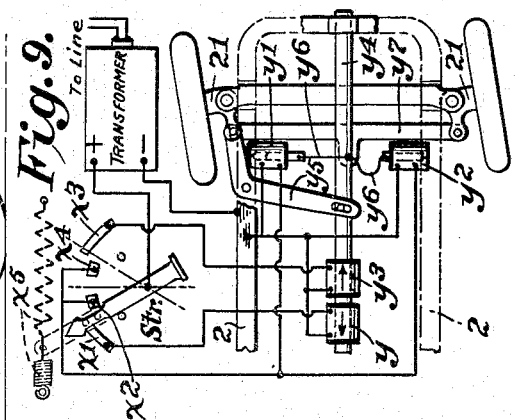
Fig. 9 is a diagram of another form of steering apparatus involving the use of solenoids.

Referring to Fig. 9, this shows a steering mechanism operated through a remote control lever $Str$ which is shown in position to set the steering wheels to the left, the circuit from the transformer being completed through contact $x1$ so as to energize the solenoid $y$. This operates rod $y4$ and lever $y5$ connected with the steering knuckles, as shown. By moving the steering control lever off from contact $x1$ so as to break circuit at this point, the solenoid will be deenergized and the wheels will stay in the position to steer leftward, as shown in this diagram. If the control lever is set on contact $x2$, then solenoids $y1$, $y2$ are both energized and the steering wheels will be returned to straight, forward position. The cores of these solenoids, when the latter are energized, move in directions opposite to each other. They draw upon the flexible connection $y6$ and this makes the cross bar $y7$ assume central position and restore the steering mechanism to central position. For steering rightward, solenoid $y3$ is energized by moving lever $Str$ onto contact $x3$, and if it is again desired to restore the wheels to central position for going directly forward, then the lever $Str$ is moved from contact $x3$ to contact $x4$, thus energizing magnets $y1$ and $y2$ which pull equally upon the flexible connection $y6$ and straightens both of them so that cross bar $y7$ will assume its middle position, and, in doing so, will operate the steering knuckles to set the steering wheels in straight ahead position. Should it be desired to maintain magnet $y$ energized at the same time that $y1$ and $y2$ are energized, then magnet $y$ would be weaker than magnets $y1$ and $y2$, and when lever $Str$ is on contact $x2$, it would still be in engagement with contact $x1$, said contacts $x1$ and $x2$ being so disposed that the lever $Str$ would overlap both. For steering leftward, however, lever $Str$ would be moved to being in engagement only with contact $x1$. What has just been said about contacts $x1$ and $x2$ is also true of contacts $x3$ and $x4$, when steering rightward, or restoring to central position. This lever $Str$ is restored to neutral position by a spring $x5$.

Figure 11:
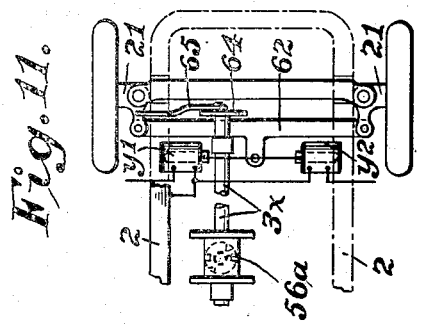
Figs. 10 and 11 are views of another modified form of steering mechanism.
Figure 10:
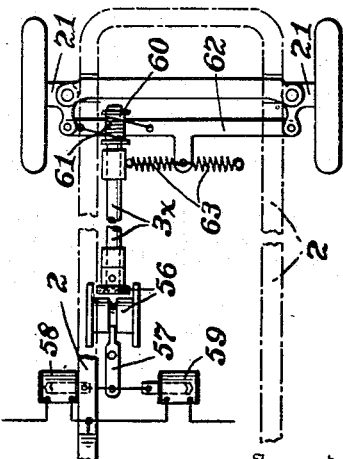

Other forms of steering mechanism are shown in Figs. 10 and 11. In Fig. 10, a shaft $3x$ receives power from the motor through a friction clutch 56 which may be set for either righthand or lefthand steering through a lever 57, controlled by solenoids 58, 59, energized through a distant control lever at the instrument board or panel. Motion from the shaft $3x$ is transmitted to the steering knuckles through a drum 60, winding cable 61, and cross bar 62. A spring 63 will return the wheels to neutral position when the clutch 56 is set in intermediate position.

In Fig. 11 is shown a crank wheel 64 and pitman 65 for setting the steering connections according to the setting of the shaft $3x$ driven from the motor through a friction clutch 56a. Solenoids like $y1$, $y2$, before described, are used to restore the wheels to normal, straight ahead position.

I claim:

1. A toy vehicle having an electric motor for driving it, transmission mechanism for impelling the vehicle, a clutch between said motor and transmission mechanism, means for operating said clutch electrically, including a control member located remote from the vehicle, and brake mechanism also operated electrically and automatically setting itself to check the vehicle when the clutch is released, substantially as described.

2. A toy vehicle according to claim 1 in which the drive is reversible and under remote control, and the brake will operate whether the motion of the vehicle be forward or backward.

3. A toy vehicle having a motor mounted thereon, a clutch, power transmission connections from the clutch to traction wheels, a pair of solenoids, a member operated by one of said solenoids to set the clutch, and by the other solenoid to release the clutch, a brake and a solenoid energized substantially simultaneously with the clutch release solenoid to set the brake when the transmission connections are disconnected from the motor, substantially as described.

4. A toy vehicle, a motor thereon, steering wheels, means connectible with the motor for setting said steering wheels, electric operable means for controlling the connection between the first mentioned means and the motor and thereby the setting of the steering wheels in position for steering rightward or leftward, and for enabling restoring the wheels to straight position, said second named means including a remote control device, said device being positively operated to set the wheels in either of the steering positions mentioned.

5. A toy according to claim 4, having a pair of solenoids for positively restoring the steering wheels to straight ahead position, said solenoids having their cores in alignment and operating in opposite directions when their coils are energized, said cores being connected with the first mentioned steering means by flexible connections, substantially as described.

6. A toy according to claim 4 in which the remote control means consists of a circuit closer operating between two contacts, one for righthand steering, and the other for lefthand steering, said circuit closer when moved off and on either contact repeatedly giving to the steering wheels a step by step adjustment during continuous running of the motor, substantially as described.

7. A toy vehicle having steering mechanism including a pair of solenoids, which when energized jointly act to set the steering wheels in central straight ahead position.

8. A toy vehicle having a motor mounted thereon, a transmission shaft extending rearwardly from the motor, a rear axle, geared to the transmission shaft, a clutch between the transmission shaft and the motor, electrically operated means for operating the clutch, a shaft extending from the motor forwardly in respect thereto, steering mechanism operated by said shaft and connected with the front wheels of the vehicle to adjust them for steering, electromagnetic means for changing the direction of motion transmitted from said forwardly extending shaft to the steering mechanism, and a remote control device controlling the clutch operating means, and a remote control device controlling the electromagnetic means controlling the direction of movement of the steering mechanism.

9. In a toy vehicle and in combination steering wheels, a pair of electromagnetic members, one for righthand and the other for lefthand steering, a remote control device, contacts cooperating with said remote control device to close the circuit of either of said electro-magnetic members, a pair of electromagnet members for restoring the steering mechanism for running straight forward, and circuit closing contact means for energizing the last mentioned pair of electromagnetic means simultaneously.

10. A toy according to claim 9 in which the remote control device comprises a contact for steering righthand, a contact for steering lefthand, and a pair of contacts for setting the wheels for straight ahead steering, a single control lever for closing the circuits at the respective contacts, said pair of contacts being arranged between the righthand and lefthand contact, and having a space between them for the setting of the control lever in neutral position, substantially as described.

11. A toy vehicle having a motor mounted thereon, steering mechanism, power transmission mechanism for driving traction wheels, a service member movable on the vehicle such as a dumping body or a shovel for performing service, an electric motor common to and for actuating the steering means, the power transmission mechanism, and the service member, electromagnetic means for controlling the connection between the motor and the steering mechanism, electromagnetic means for controlling the connection between the motor and the power transmission mechanism, electromagnetic means for controlling the connection between the motor and the service member, and remote control means for the electromagnetic means, substantially as described.

12. A toy vehicle comprising a chassis having a motor driven transmission for running forward or backward, a service member movably mounted on the chassis, a driving connection between the same and the motor drive, whereby said service member is operated, a limit switch operated at the prescribed limit of movement of the service member, and electromagnetic means controlled by said limit switch to throw out the drive connection of said service member and arrest the same at the prescribed limit, substantially as described.

13. A toy vehicle according to claim 12 in which the limit switch throws out the drive connection of the service member on either stroke of said member.

14. A toy vehicle according to claim 12 in which electromagnetic means when energized throws in the driving connection of the service member, and a remote control for said electromagnetic means, substantially as described.

15. A toy vehicle according to claim 12 in which the motor drive is reversible so that the service member is moved in one direction when said drive is in a forward direction, and in the other direction when the said motor drive is reversed, said limit switch throwing said driving connection of the service member out at either end of its stroke, substantially as described.

16. A toy vehicle according to claim 12 in which a circuit is established by said limit switch to the electromagnetic throw out means, and in which in the throwing out action the circuit to said electromagnetic means is broken, substantially as described.

17. A toy vehicle having a reversible transmission drive for forward or backward running, a switch for controlling the change in the driving direction, a service member, a connection from the motor drive for operating said member in one direcion when the drive is forward, and for moving said service member in the opposite direction when the drive is reversed, a clutch controlling said connection, a clutch lever, an electromagnetic device for operating said clutch lever to release the clutch, a limit switch, operated by the service member when it reaches a prescribed limit of movement in either direction to energize said electromagnet, said energizing taking place through a contact on the clutch lever which on completing the clutch release opens the circuit to de-energize said electromagnetic device.

18. A toy vehicle having a motor drive, a service member on said vehicle, a drive connection for said service member, including a clutch operating the said motor drive, a reversing switch for changing the motor drive from forward to reverse movement, or vice versa, electromagnetic means for setting the clutch in operative position, a switch automatically operated as a consequence of the service member reaching a prescribed limit of movement in either direction, said switch opening the circuit of the electromagnetic device, for the release of the clutch, and closing another contact through which circuit to said electromagnetic device will be closed for throwing the said clutch in and moving the service member in the opposite direction when the motor drive change switch is operated to reverse the motor drive.

19. A toy vehicle according to claim 18 in which a service member control switch closes its circuit through the reversing switch, substantially as described.

20. A toy vehicle, a service member movably mounted on said vehicle, a drive for said service member with a switch for reversing it, a clutch in said drive, an electromagnetic device for releasing said clutch, an electromagnetic device for setting said clutch in operative position, a switch for automatically energizing the clutch releasing electro-magnetic device when the prescribed limit of movement of the service member in one direction is completed, a switch operated automatically when the service member reaches said prescribed limit for de-energizing the clutch-setting-electromagnetic device, and for establishing another contact for energizing said clutch-setting-electromagnetic device when the reversing switch is set to change the direction of the drive of said service member, and when circuit is established through said reversing switch and contact, and a control lever for establishing said circuit, substantially as described.

21. A toy vehicle having an electric drive, a plurality of devices on said vehicle for performing various operations such as steering, moving a service member, and the like, and an automatic remote controlling means having contacts for closing circuits in a prescribed order to operate said plurality of devices in prescribed sequence.

CHESTER A. SPOTZ.